US008678929B1

(12) United States Patent
Nishimura et al.

(10) Patent No.: US 8,678,929 B1
(45) Date of Patent: Mar. 25, 2014

(54) CLIENT-SIDE PREDICTION OF A LOCAL GAME OBJECT TO REDUCE APPARENT NETWORK LAG OF MULTIPLAYER SIMULATIONS

(75) Inventors: Hitoshi Nishimura, West Vancouver (CA); Wu Hai, Richmond (CA); Harold Chaput, Vancouver (CA); Wilson Venhola, Vancouver (CA); Asim Shahjahan, Vancouver (CA)

(73) Assignee: Electronics Arts Inc., Redwood City, CA (US)

( * ) Notice: Subject to any disclaimer, the term of this patent is extended or adjusted under 35 U.S.C. 154(b) by 1385 days.

(21) Appl. No.: 12/184,975

(22) Filed: Aug. 1, 2008

(51) Int. Cl.
*G06F 15/16* (2006.01)
*A63F 13/00* (2006.01)

(52) U.S. Cl.
USPC ............. 463/42; 463/4; 463/6; 463/7; 463/31

(58) Field of Classification Search
USPC .......................................... 463/42, 31, 4, 6, 7
See application file for complete search history.

(56) References Cited

U.S. PATENT DOCUMENTS

| | | | | |
|---|---|---|---|---|
| 4,570,930 A * | 2/1986 | Matheson | ........................ | 463/41 |
| 5,623,642 A * | 4/1997 | Katz et al. | .......................... | 703/7 |
| 5,899,810 A * | 5/1999 | Smith | ............................ | 463/42 |
| 5,974,442 A * | 10/1999 | Adams | ........................... | 709/200 |
| 6,042,477 A * | 3/2000 | Addink | ........................... | 463/42 |
| 6,415,317 B1 * | 7/2002 | Yelon et al. | .................... | 709/205 |
| 6,801,930 B1 * | 10/2004 | Dionne et al. | ................. | 709/205 |
| 7,181,494 B2 * | 2/2007 | Lavoie et al. | ................. | 709/205 |
| 7,627,632 B2 * | 12/2009 | Douceur et al. | .............. | 709/205 |
| 7,680,038 B1 * | 3/2010 | Gourlay | ........................ | 370/230 |
| 7,803,054 B1 * | 9/2010 | Ogus et al. | ...................... | 463/42 |
| 7,925,601 B2 * | 4/2011 | Douceur et al. | ................ | 706/14 |
| 8,069,258 B1 * | 11/2011 | Howell | ........................... | 709/230 |
| 8,272,953 B2 * | 9/2012 | Fujisawa | ......................... | 463/31 |
| 8,317,580 B2 * | 11/2012 | Kikuchi | ............................ | 463/7 |
| 2002/0142843 A1 * | 10/2002 | Roelofs | ........................... | 463/42 |
| 2004/0121837 A1 * | 6/2004 | Chiang et al. | ................... | 463/24 |
| 2005/0192098 A1 * | 9/2005 | Guo et al. | ....................... | 463/42 |
| 2006/0135258 A1 * | 6/2006 | Maheshwari et al. | .......... | 463/42 |
| 2006/0154713 A1 * | 7/2006 | Sunazuka et al. | ................. | 463/6 |
| 2007/0078003 A1 * | 4/2007 | Sato et al. | ....................... | 463/43 |
| 2007/0087836 A1 * | 4/2007 | Pasula | ............................. | 463/43 |
| 2007/0238529 A1 * | 10/2007 | Iwamoto et al. | ................ | 463/42 |
| 2007/0270225 A1 * | 11/2007 | Wang et al. | ..................... | 463/42 |
| 2008/0146342 A1 * | 6/2008 | Harvey et al. | ................... | 463/42 |
| 2012/0100912 A1 * | 4/2012 | Kim et al. | ........................ | 463/31 |

* cited by examiner

*Primary Examiner* — William H McCulloch, Jr.

(57) ABSTRACT

A method for operating a networked interactive game system is provided. An input command generated by a local user of a local game system that controls a local object of an interactive game may be received. A state for the local object in the present game frame may be predicted based on the input command. State data of a first object of the interactive game that was determined in a network simulation of a previous game frame may be retrieved. A global object of the interactive game in the present game frame may be course-corrected to be aligned with the global object in the previous game frame using the predicted state for the local object in the present game frame and the state data of the first object of the previous game frame. The present game frame may be rendered with the course-corrected global object.

20 Claims, 7 Drawing Sheets

CLIENT-SIDE PREDICTION OF A LOCAL GAME OBJECT TO REDUCE APPARENT NETWORK LAG OF MULTIPLAYER SIMULATIONS

FIELD OF THE INVENTION

The present invention relates generally to interactive applications and in particular to reducing the appearance of network lag in an interactive system where user interaction is communicated between nodes of a network.

BACKGROUND OF THE INVENTION

In most video games, a game engine runs according to the rules of the game taking into account user input and presenting an animated display that is responsive to the user input. For example, if the user presses a button that is a "jump" button according to the game rules, then the game engine would animate a character such that it appears to jump. The display of a video game is generally a video sequence presented to a display capable of displaying the video sequence. The video sequence typically comprises a plurality of frames. As used herein, "frame" refers to an image of the video sequence. By showing frames in succession in sequence order, simulated objects appear to move. The game engine typically generates frames in real-time response to user input that is available to the game engine, so delay in receiving game inputs would normally delay the display of game play.

Online video games and other interactive applications can involve multiple users who interact or communicate with each other. There is a demand to produce interactive games with real-time capabilities for networked game play that timely respond to a user's inputs such that the user's movement of a joystick causes a character in a scene to move and the movement appears to the user to be in real-time.

An issue for real-time systems in the context of networked game play is network latency. Network latency is the time required to deliver network packets from one node within the network to another node or otherwise communicated. In a client-server model, one host on the network, the server, acts as a central communications hub for all the other hosts or clients. Typically the server is authoritative, and is responsible for routing communication between the several clients. In such situations, all game play information must first be communicated to the server before being relayed back to the client nodes. In these systems, each client node sends it's user input signals to the server. The server collects user input data from all participating nodes, generates a simulation and/or state information of the objects within the game, and delivers the results to each client node. The back-and-forth communication and server-side processing required for each frame of the game can create problems that prevent the game from playing sufficiently fast. Essentially, all of the client nodes, which cannot normally process game inputs until it receives them from the server, will wait for the simulation information provided by the server. The communications between the server and client(s) are also subject to network latency.

In the peer-to-peer networking topology, the client nodes in the network communicate directly with one another. Peer-to-peer applications largely distribute the responsibility for the simulation or application among the peers. Essentially, each peer node performs the same simulation as the other peer nodes. By performing the simulations locally, the peer nodes are not dependent on the simulation processing performed by a server in the client-server model. As a consequence of moving the responsibility of generating the simulations on the local systems, this topology may save some trips, but it requires synchronization to ensure the states between the peer nodes are in harmony. Typically, the synchronization of game states among the peer nodes necessitates that the local node waits to generate a simulation for a particular frame until inputs from all peer nodes are received for that frame. Thus, each peer node waits for communication of input signals by other peers. The communications between the peer nodes are also subject to network latency. To the extent network latency is noticeable to a user, real-time interactivity is impaired. Ideally, the user should not perceive any lack of responsiveness of the game.

In any networking scenario, the sending and receiving of inputs for each frame can produce large amounts of network traffic. Networks however have a limited capacity to convey information, and multiple computers and applications must share that limited resource. For example, networks such as the Internet connect several computers with network links having a limited bandwidth that is shared among the many computers, each of which wants to maximize its usage of available bandwidth. When attempted data rates exceed the network capacity to convey that data, the network congests and the effective network capacity becomes a small fraction of the theoretical capacity, producing network delays. Uncongested networks may have latency due to the time needed for packets to traverse the network. Where latency is significant, interactive video games are impractical and interactions between users across the network are significantly degraded.

BRIEF SUMMARY OF THE INVENTION

In accordance with an embodiment of the invention, systems and methods for client-side prediction of a local game object are provided. For a networked interactive game system including at least one local game system and at least one remote game system, where a network is interposed between the local and remote game systems, distributed game play is allowed of an interactive game that includes a display of game events with a series of game frames. An input command that was generated by a local user of the local game system that controls a local object of the interactive game may be received. A state for the local object in the present game frame may be predicted based on the input command. State data of a first object of the interactive game that was determined in a network simulation of a previous game frame may be retrieved. The network simulation at least determines states of objects of the interactive game from at least two game systems for use in game processing. A global object of the interactive game in the present game frame may be course-corrected to be aligned with the global object in the previous game frame using the predicted state for the local object in the present game frame and the state data of the first object of the previous game frame. The present game frame may be rendered with the course-corrected global object.

In one embodiment of the invention, the processing flow of the input commands includes running multiple simulations of each frame on a local node. A simulation is a computer process that takes into account game state information of various objects both locally-controlled and remotely-controlled, global objects, user input, and game rules to determine a new game state and/or interaction information. Two simulations, a local simulation and a network simulation, may run asynchronously for a single frame, each frame corresponding to a single time phase within the game. The local and network simulations can use input swapping techniques between the local and remote game consoles within the game play network. In a system with network lag, the local simulation operates in a present time phase, whereas the network simulation operates in a past time phase.

The local simulation of a present frame in the game can incorporate a local player's commands, for example to move a local character in the game. These movements are made in a present time period. In other words, the movements of the locally-controlled character are responsive to the real-time user inputs. Where the remote player's commands are not available for the present frame due to network lag, a guess about their movements for the present frame can be garnered from applying game artificial intelligence (game AI) analysis in the local simulation. The guess may be measured against the last known state of the game universe in the game.

In one embodiment, the local simulation maintains the state of the game universe using a feedback loop that uses the state of the universe for a past time period to make a decision about the networked objects' states for a frame in the present time period. In other embodiments, states may be copied, for example using a memory copying function, from the network simulation as frames are generated in the networked game. Based on the local player's input commands and the AI guess of the networked objects' states, a prediction is made about the state of the local character for the present frame. Using the predicted state, a pose of the local player for the present frame is determined. Additionally, a network simulation for the local and remote players is also run on the local game console. Where network lag is present, the network simulation operates on a frame for a previous time phase. The network simulation sends its calculation of poses for the remote players to the local console. The local console renders and displays the pose of the local player and the received poses of the remote players. Additionally, shared global objects are course-corrected over a series of ticks and displayed.

Embodiments can be made using computer hardware to implement the functionality, computer software comprising program code made up of instructions that, when executed, perform that functionality, or some combination. The computer software can be special-purpose game hardware or a general-purpose programmable device or system. The present invention can also be embodied on computer-readable media that, when combined with a computer or computing device, implements the invention. Such media might include CD-ROM, DVD, or networked storage such as an Internet-connected file server.

A computer readable medium that includes embodiments of the present invention is included. Other features and advantages of the invention will be apparent in view of the following detailed description and preferred embodiments.

DETAILED DESCRIPTION OF THE INVENTION

Figure 1:
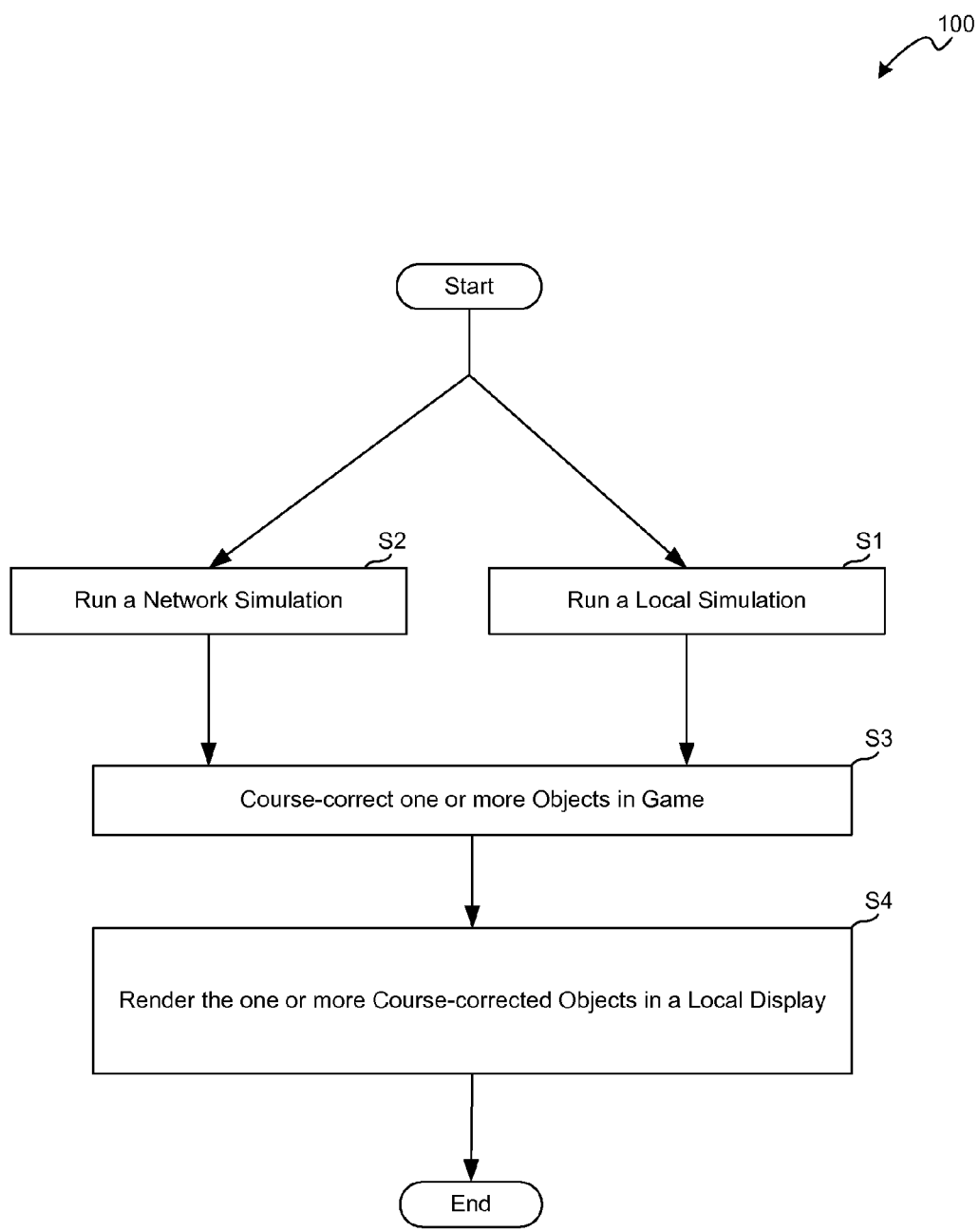
FIG. 1 is an exemplary process flow diagram which illustrates one method of client side prediction of a local game object to reduce apparent network lag.

A method for client side (local) prediction of one or more local game objects to reduce apparent network lag of multi-player simulations for interactive games, such as networked video games and other applications, is described herein.

A simulation is a process wherein a game device, server or system determines new states for a game based on a prior state and player inputs. A state of a game might include where various players' characters are in a game space, a score, an inventory of game objects available to those characters, a camera location, positions/stances of characters or other game objects, etc. For example, if the frame is a soccer game, the game state might include positions of a ball and 22 players, a score, time left on the clock, etc. and in one simulation cycle, the game system considers that state and current user inputs for the current cycle to arrive at a new state for the current cycle. A display image can then be generated for the new state. A simulation cycle's period can coincide with an update rate of a display image, but this is not required. Where not all user inputs are available for a current simulation cycle, more than one simulation can be run and suitably blended in order to generate a current display image.

One simulation can be a network simulation that waits until all user inputs (or all necessary user inputs) are available for a given cycle. Of course, this may result (depending on network latency or delays) in the simulation running for a past cycle. In an embodiment of the present invention, one simulation is run for a current cycle with local user inputs (and possibly other user inputs, if available) and the simulation makes a guess, default, estimate and/or approximation of the unavailable user inputs, while another simulation (a network simulation) is run for a prior cycle where at least all simulations can be merged/blended to provide a display image for a current cycle, thereby providing a local player with an apparent reduction in network lag/delay. As network lag/delay goes down, the network simulation gets closer in time to the local simulation, and the merge/blend process should provide a smooth transition.

It should be understood that the invention is not limited to a particular type of game hardware, but might apply to consoles, computers, handheld devices, cell phones capable of playing games, and other hardware. Game consoles are made by several vendors, such as Microsoft's Xbox 360™ console, Sony's PS3™ console, and Nintendo's Wii™ console, the portable DS, Sony's portable PSP™ device, and Apple's portable iPhone™ device.

Typically, the play of a game depends on what input is provided, i.e., the game is interactive. An end user of an interactive or other game is often referred to as a "player". That player is provided with user input devices to convey the player's inputs to an interactive video game. In one embodiment, a local player has authority over a local game object. The interactive video game also provides for outputs, such as a video display output and/or an audio output. Other outputs might also be present, such as a data transfer output (or input/output) for interacting with other game systems and/or storage and/or remote data systems, etc. It should be understood that the actual display is not required for embodiments of the present invention, but can be added to a game system when the player plays the game. For example, aspects of the invention might be embodied in instructions forming program code stored on computer-readable media programmed such that ordinary and/or readily available computers, computing devices, game consoles or other platforms can be provided with the program code and/or computer-readable media to provide the player with an interactive video game playing experience when coupled to a display or other output device.

In the description that follows, embodiments of systems and methods having aspects of the present invention will be described, in part, with reference to certain illustrated embodiments. These embodiments largely encompass examples of systems and methods suitable for allowing networked interactive applications to operate, such as a networked video game. However, the invention is not limited to any particular architecture, environment, application, or implementation. For example, although embodiments will be described in reference to gaming applications, the invention may encompass other applications and features including other applications where it will be beneficial to reduce the degrading effect of network lag. Moreover, embodiments will be described directed to a peer-to-peer networking topology. However, embodiments may include other network topologies, such as client-server topologies. Therefore, the description of the embodiments that follows should be construed for purposes of illustration and not limitation. Further details are provided in reference to the figures described below.

Two simulations, a local simulation and a network simulation, may run asynchronously for a single frame, each frame corresponding to a single time phase within the game. The local simulation and the network simulation can be run independently, and as such, the local simulation can provide a steady frame rate to the local user. As long as the network delay does not exceed a threshold, the local player should not notice any course-correction performed on game objects as they are rendered and displayed while the network lag varies. In a system with network lag, the local simulation operates in a present time frame, whereas the network simulation operates in a past time phase.

In order to determine the course-corrected positional values of the shared global objects, a two-way blending process may be performed. As used herein, "blending" may include interpolation, including linear and/or trajectory interpolation, where a weighted average of coordinates or trajectories are used to determine a new position. In a first blending step, the network simulation sends its calculation of a pose for the local player to the local console, which then blends the poses of the local character from the local simulation and the network simulation. A second level of blending may take place for shared global objects. Using the blended pose for the local player, a positional value for the shared global object is determined on the local console. This represents the expected location of the shared global object based on the blended position of the local player. The expected location of the shared global object is then blended with the positional values for the shared global object as determined by the network simulation. This blended position of the shared global object is finally rendered and displayed along with the local and remote players. By rendering and displaying the local game object as described herein, the local game player views the game frame as being responsive to the input commands in real-time, and by rendering the course-corrected shared global objects, the local simulation is blended to reality, i.e., to be more aligned with the network simulation. In another embodiment, the blended local game object may also be rendered and displayed.

FIG. 1 is an exemplary process flow diagram 100 which illustrates one method of client side prediction of a local game object to reduce apparent network lag. The steps are labeled S1, S2, S3, but might be performed in an order other than the order of the labels. In one embodiment, the process flow 100 is performed on a local node connected to a peer-to-peer network. Flow 100 shows the process of generating multiple simulations of a frame within an interactive video game. In one embodiment, two distinct simulations are generated. A first simulation ("local simulation") is generated in real-time, using a predicted state of a local game object for a present frame in the game play. The predicted state of the local game object is determined using a local player's input commands. After the simulation is performed, one or more shared global objects in the game are course-corrected in order to match the state of the shared global objects as determined by a network simulation. The state of the local game object (and possibly non local game objects) may be "predicted" in that some proxy is used for the as-yet unavailable remote user inputs, such as a guess, results of AI, extrapolation, etc. Even where the local game object is an object controlled by local user inputs, it might still depend on remote user inputs. For example, a local user input might direct a football player to run, but remote inputs might be such that a remote player's inputs caused the remote player's character to knock the local player's character down. Since these are two different states resulting in two different displays, the local simulation needs to decide on what the remote player's inputs might have been.

The frame is then rendered and displayed to the local player using the predicted state of the local game object and the one or more course-corrected shared global objects. From the vantage point of the local player, the local player's game object appears to be instantaneously responsive to the input commands, even within the context of networked game play. A second simulation ("network simulation") is also performed for the same frame using state data, interaction data, and input commands of all the remote players within the game.

Some previous solutions have a simulator generating the network simulation on a local player's game console that waits for input command signals from the remote game consoles within the network before rendering the frame on the players' video displays. In those systems, the wait time causes a noticeable delay between rendering of frames during game play. In one embodiment of the present invention, the local simulation increases the gaming experience by diminishing the effects of network lag. The network simulation for a frame is not rendered or displayed to the game player. Instead, the network simulation for a previous frame (i.e., frame for a previous time phase) is generated and the state information for the local game object and the shared global objects is used to perform course-correction of the shared global objects. Thus, the local simulation enables real-time multiplayer gaming during networked game play and the network simulation enables the local simulation to render course-corrected objects which are corrected so as to be harmonized with the network simulation.

In step S1, a local simulation is run using the local player's input command that is generated for the present frame in the video game. An input command is any command provided by or determined from player input, such as: controller data from a player's interaction with a game controller, a command to spawn a new player, and X, Y, Z coordinates of a game object. The output of one portion of the simulation is a predicted state of the local game object for the present frame at t, where t denotes the present frame to be rendered and displayed at a current time. In another embodiment, the output is a predicted pose for the local game object. Various target poses may be created for a character, such as in keyframe animation, and intervening frames of animation can be generated to transition the character being animated from one pose to the next pose.

Traditional distributed peer-to-peer game play requires that each local node send the input signals of the local player to every other node in the network once those inputs commands are received. In step S2, a network simulation is run for a previous frame using the input commands from each node in the network. In one embodiment, the local player's input commands are supplied from a local pad. Delays in the network may cause the network simulation to run behind in time from the local simulation. Accordingly, the network simulation operates on a previous frame at t-n, where t denotes a current time and n denotes the network delay not including game latency. The output of the network simulation is a state or a pose for the networked game objects and the local game object(s) at t-n. In addition, the network simulation also provides a state or positional information for one or more shared global objects at t-n.

In step S3, course correction of one or more of the shared global objects is performed for the local simulation of the frame at t. Course-correction is used to smoothly move, over a series of ticks, an object from where the local simulation predicts it to be to where the network declares it to be. This may be accomplished by blending positional values of a locally simulated prediction of the shared global object at t with that of the network simulation at t-n. The output of course-correction is a blended state or positional information of the one or more shared global objects. As previously mentioned, "blending" may include interpolation, including linear and/or trajectory interpolation, where a weighted average of coordinates or trajectories are used to determine a new position.

For example, in the context of a soccer game, a local player may control a local game object(s) and remote players may control remote game objects. A shared global object, such as a soccer ball, may be controlled by any one of the local players or remote players. During networked game play, the soccer ball is course-corrected, such that the location of the ball that is rendered and displayed on the local player's display is the result of blending between the predicted location of the ball, as determined by the local simulation, and the location that is known to the network simulation. Course-correction is described in further detail in FIG. 2. Of course, these techniques can also apply to other sports games (i.e., American football, tennis, golf, racing, etc.) and non-sport games.

In step S4, the one or more course-corrected objects are rendered on a display of the local player. In addition, the predicted pose of the local object at t (as determined by the local simulation) and the poses for the networked game objects at t-n (as determined by the network simulation) are also rendered on the local display.

Figure 2:
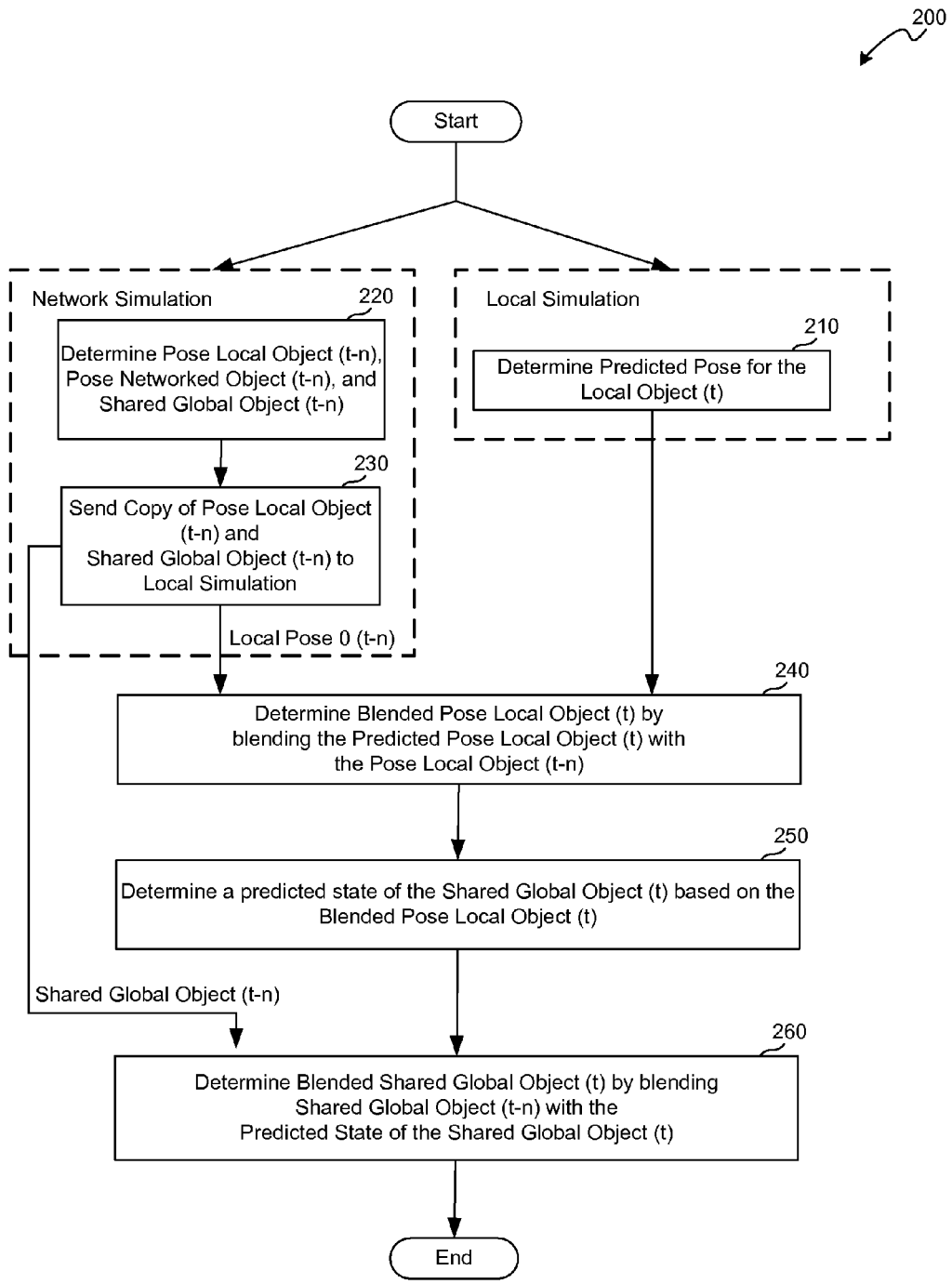
FIG. 2 is an exemplary process flow diagram that illustrates one method of course-correction between a network simulation and a local simulation.

FIG. 2 is an exemplary process flow diagram 200 that illustrates one method of course-correction between a network simulation and a local simulation. At step 210, a predicted pose for the local game object(s) at t is determined by the local simulation. This predicted pose can be used in a two-step blending (i.e., interpolation) process for course-correction of the one or more shared global objects. At step 220, the pose for the local game object(s) at t-n, the pose for the networked game object at t-n, and the state or positional values of the one or more shared global objects at t-n are determined by the network simulation. The pose for the local game object(s) and the state or positional values of the shared global objects can be used in the two-step blending process for course-correction of the shared global objects. Accordingly, at step 230, the pose for the local game object(s) and the state or positional values of the shared global objects are sent to the local simulation to be used in course-correction. The pose for the networked game object may be used for rendering and displaying the frame to the local player.

Step 240 is the first of the two-step blending process for course-correction, in which the blended pose for the local object at t is determined. The blended pose can essentially be a combination or blend of the values of the predicted pose of the local object at t (as determined by the local simulation) and the actual pose of the local object at t-n (as determined by the network simulation). The blended pose can then be used to predict the state or positional values of the shared global object. At step 250, a state or positional values of the shared global object is predicted based on the blended pose, which was determined at step 240.

Step 260 is the second of the two-step blending process for course-correction, in which a blended state or positional values of the shared global object is determined. The blended shared global object represents the combination or blend of where the local simulation predicts the shared global object to be with where the network simulation dictates the shared global object to be. In particular, the shared global object at t-n is blended with the predicted state or positional values of the shared global object at t. Accordingly, the blended shared global object can be rendered as a course-corrected object. When blending is accomplished using the two-step process described herein, the local player perceives the local node to be operating in real-time during networked game play.

Figure 3:
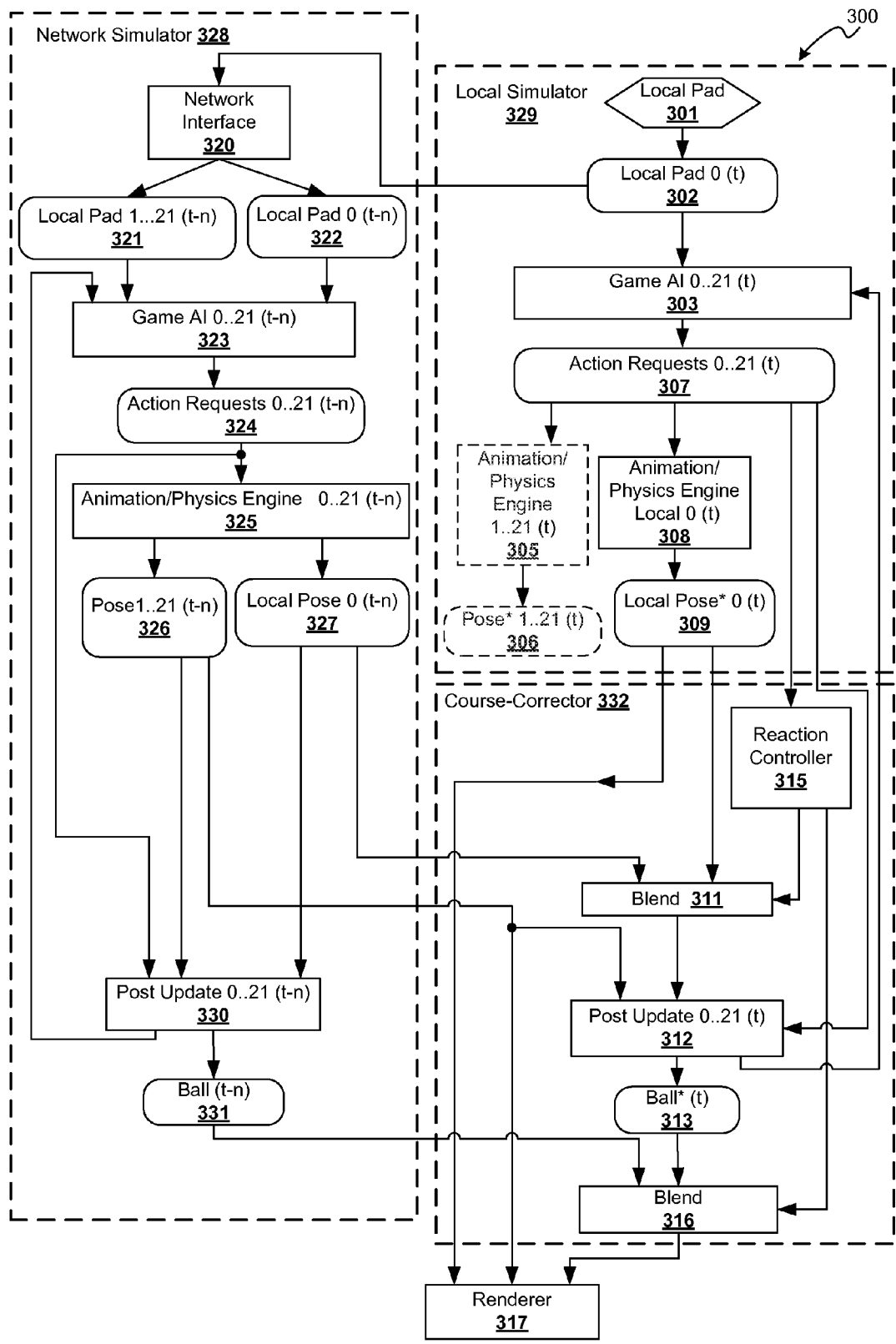
FIG. 3 illustrates a game system for providing course-correction for shared global objects.

FIG. 3 illustrates a game system 300 for providing course-correction for shared global objects. Game system 300 includes network simulator 328, local simulator 329, course-corrector 332, and renderer 317. In one embodiment, game system 300 is a local node connected to a peer-to-peer network. The game command flow might begin when power is first supplied to game system 300, when it is reset or similar events. Program data of a game may be loaded. Thereafter, the game advances on the basis of the program data and player/user input provided by the game player via input devices. Input devices may include game controllers to convey the player's inputs to the interactive game for the present frame at time t to be simulated and displayed to the player.

The player input, such as to control movements of the local object of the interactive application, may be received by the local node. As used herein, player input is a broad term encompassing input provided by a player of the game. Local simulator 329 includes a local pad 301, which stores a snapshot of the state of one or more objects that are controlled by the local player. The model described herein may be supported for any number of networked, local, and non-player characters. In the context of a soccer game, twenty-two game players may be present, any subset of which may be networked, local, or non-player characters.

The snapshot can be free of context. For example, the snapshot may include information that a left arrow button on the input device was depressed by the local player. In one embodiment, the local player's interaction with the control device is directed to exercise control over a local game object or character. Accordingly, the local pad may include a snapshot of the local game object(s) for the present frame in the game. The snapshot for the local game object(s) may be denoted as Local Pad 0 (t) 302, where t indicates the present frame to be rendered and displayed at the current time, and 0 uniquely identifies the game object among a plurality of game objects. In one embodiment, input swapping techniques are employed to relay information and maintain synchrony between the local and remote consoles during networked game play. As such, a copy of the Local Pad 302 is sent to the Network Simulation 328 for processing and for swapping with the other nodes in the network.

Additionally, the Local Pad 302 is provided to a game artificial intelligence engine (game AI) 303. The game AI 303 applies AI analysis on the networked game objects at t, based on the last known states of the networked game objects, to derive a guess about the states of the objects for a current frame. Using the Local Pad 302 and the states of the networked objects at t, the game AI determines high-level control parameters, such as context-dependent action requests 307, for each of the game objects. Action requests may include information such as which joints in a skeletal representation of an object need to be moved and the direction of movement in order to carry out the player's input command Action requests resolve the question of whether a particular action is physically possible and contextually true. As shown, action requests are generated for each of game objects 0-21 at t. For example, suppose the context free pad information (i.e., left button depressed) is processed and transformed to context-dependent action requests (i.e., start running in a northerly direction at speed X). The action requests 307 are provided to a post update module 312 and a reaction controller 315, which is described in further detail below.

The action requests are also provided to animation/physics engine 308. Animation engine 308 might perform an actual physics simulation of game characters for which states for the present frame are known to the local game console. For example, the local console receives in real-time input commands for the Local object 0 (t), and performs a physical simulation on the Local object 0. Animation/physics engine 308 may also perform collision detection. The output of animation engine 308 is a client-side prediction of the local object, denoted Local Pose*0 (t) 309, where * indicates a predicted value and "client-side" refers to a same system, software, and/or device that is local to the local player. Various target poses may be created for a character and intervening frames of animation can be generated to transition the character being animated from one pose to the next pose. It should be noted that only the state of the local game object need be predicted. The states of networked game objects need not be predicted, as is typically done in client-side prediction using dead reckoning.

Additionally, the action requests may be provided to animation/physics engine 305. Animation engine 305 is functionally similar to animation engine 308, except that animation engine 305 performs an actual physics simulation of game characters if the states/poses for the networked game objects are unknown or cannot be trusted if received from the network simulation. The output of animation engine 305 may be a client-side prediction of the remote objects, denoted Pose*1-21 (t) 306. Although animation/physics engines 305 and 308 are depicted as separate units, the functions of both engines 305 and 308 may be performed by a single animation/physics engine.

In order to perform course-correction, network simulator 328 provides known position, state, or other information about the game objects to the course-corrector 332. Using the information garnered from the local and network simulations, one or more shared global objects are course-corrected for the present frame prior to rendering and displaying a display of the present frame to the local player. Network simulator 328 includes a network interface 320 for receiving snapshot of state information from remote nodes and for receiving local game object information, such as Local Pad 0 (t) 302, from the local simulation as input commands are received. In one embodiment, the network interface 320 includes a storage for the local and remote snapshot information. When the network delay is greater than zero, n>0, the network simulation operates on a previous frame t-n. Snapshots for the networked game objects, denoted as Local Pad 1-21 (t-n) 321, are collected from the storage in the network interface 320. A snapshot of the local game object, denoted Local Pad 0 (t-n) 322, is also collected from the storage. The Local Pad 1-21 (t-n) 321 and the Local Pad 0 (t-n) 322 are provided to the game AI 323. Using the Local Pad 1-21 (t-n) 321 and the Local Pad 0 (t-n) 322, the game AI determines high-level control parameters, such as context-dependent action requests 324, for each of the game objects.

The action requests are provided to animation/physics engine 325. Animation engine 325 performs an actual physics simulation of all game characters 0-21. Animation/physics engine 308 may also perform collision detection. The output of engine 325 is an actual known network position or state of the objects 0-21. For example, the output may be a set of poses for the networked game objects, denoted Pose 1-21 (t-n) 326, and a pose for the local object, denoted Local Pose 0 (t-n) 327. The Local Pose 327 is provided to course-corrector 332. The set of poses for the networked objects, Pose 1-21 (t-n) 326, and the Local Pose 327 are provided to a post update module 330, which performs various functions such as modifying poses for collisions, determining and modifying the state of shared global objects, and analyzing player pose information (i.e., speed, momentum, etc.) in preparation for the next animation update. The output of the post update module 330 is a state or positional value for one or more shared global objects, which can be fed back to the game AI 323. In the context of a soccer game or other ball-oriented game, a shared global object may include a ball. Accordingly, the output provided by the post update module 330 includes a state of a ball, denoted Ball (t-n) 331, which is provided to the course-corrector 332.

Course-correction may then be performed, whereby one or more shared global objects are course-corrected for the present frame prior to rendering and displaying to the local player. The course-corrector 332 performs a two-level blending process. As previously mentioned, "blending" may include interpolation, including linear and/or trajectory interpolation, where a weighted average of coordinates or trajectories are used to determine a new position. In the first blend process 311 (which might be a software routine executed by a game device), the pose of the local object as determined by network simulator 328 is blended with the predicted pose as determined by local simulator 329. In particular, the local pose 0 (t-n) 327 is blended with local pose*0 (t) 309. The output of blend 311 is a blended pose of the local object at t, which is provided to a post update module 312. Using the action requests 0-21 (t) 327, Pose 1-21 (t-n) 326, and the output of blend 311, post update module 312 determines a predicted state or positional value for the one or more shared global objects, denoted Ball*(t) 313. The output of post update module 312 is fed back in a loop to game AI 303. This feedback loop maintains the synchronization of game states.

A second blend 316 may then be performed. As shown, the shared global object state for a previous frame, as determined by the network simulation, is blended with the predicted state of the global object, as determined by course-corrector 332. In particular, Ball (t-n) 331 is blended with Ball*(t) 313 to produce a blended shared global object at t. Accordingly, blend 316 moves the predicted location of the Ball at t to be closer to the location where network simulator 328 declares the Ball to be at t-n.

The blend may occur over multiple updates such that the visual effect is that of a consistent convergence and course-correction to match the real (i.e., network) simulation game.

Since the local simulation and the network simulation are separate, the local simulation can run as an illusion and provide a steady frame rate to the player. As long as the network simulation only falls behind by a threshold (i.e., a few frames), the blending is virtually unnoticeable by the player and gives the illusion that the local AI is updating instantaneously, for example, at 24 Hz, 30 Hz, 50 Hz or 60 Hz. This provides a lag-free online game experience. Thus, as the network simulation stays in synchronization with the real game, the local simulation runs at a constant frequency based on the local user's inputs.

In one embodiment, the two-step blending process, represented in FIG. 3 by blend 311 and blend 316, are controlled by a reaction controller 315. The animation of a local game character at the local simulation is blended with the network simulation to create a visual result. The reaction controller 315 can dynamically change the blend weight, such that the amount by which the final position of the game object is determined by scaling the local simulation values and/or the network simulation values according its corresponding weight. The reaction controller 315 reads the current state of the local object. When the local object has a ball, or other shared global object, the local player may be controlled by mostly the local simulation. In one embodiment, the influence of the network simulation would cause a poor visual result for handling of the ball. The influence of the network simulation is required, however, to maintain the synchrony between the disparate simulations. For example, a weight of 60% of the local simulation-side can be used when the local player is dribbling a ball. In other words, 40% of the network simulation is used. In another embodiment, the local player does not have control of the shared global object, and another weighting scheme may be used. For example, when the local player loses a ball, the weight of the local simulation is gradually changed to 20%. This scheme observes the actions of the local player and the ball. In one embodiment, the reaction controller calculates the weight given the current states. In another embodiment, the blend weights between the network and the local simulations are determined by the amount of difference between the coordinates or trajectories of the objects. A difference that exceeds a large threshold may correlate with blend weights that move the local simulation more towards that of the network.

The present frame in the game may then be rendered. In one embodiment, the renderer 317 uses the blended shared global object (t) resulting from the two-step blend process, poses for the networked game objects 1-21 (t-n) 326, and the predicted pose for the local object, Local Pose*(t) 309, to render the present frame. Accordingly, pre-blend poses for the local and networked objects are rendered in the present frame. In another embodiment, blended poses for the local and/or any networked game objects may be rendered.

Figure 4A:
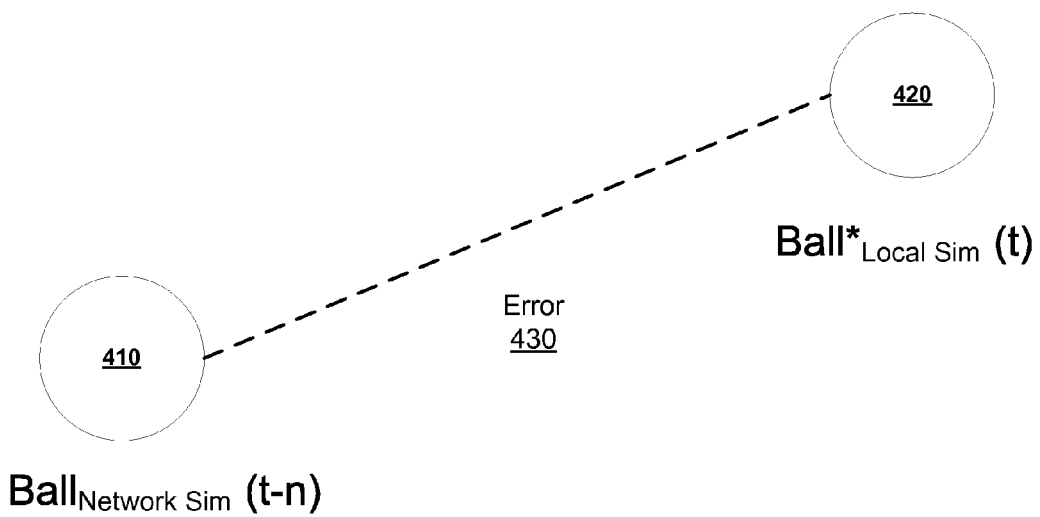
FIG. 4A illustrates a positional error for a shared global object.

FIG. 4A illustrates a positional error for a shared global object. Two simulations, a local simulation and a network simulation, may run asynchronously for a single frame. The network simulation requires the input commands from each and every remote player before running a simulation on a frame. Where network delay is apparent, the network simulation operates on a previous frame in the game, at t-n, where n is the network delay. An output of the network simulation includes a state of a shared global object. In the context of a soccer game, the shared global object may be a ball, and the output of the network simulation may include $Ball_{Network\ Sim}$ (t-n) 410.

Without waiting for input commands from all of the remote players, the local simulation makes a prediction about the location of the ball at the present frame in the game, i.e., $Ball*_{Local\ Sim}$ (t) 420. The amount of error 430 between the location of the ball as known by the network simulation and the predicted location of ball is determined. The error 430 can then be course-corrected.

Figure 4B:
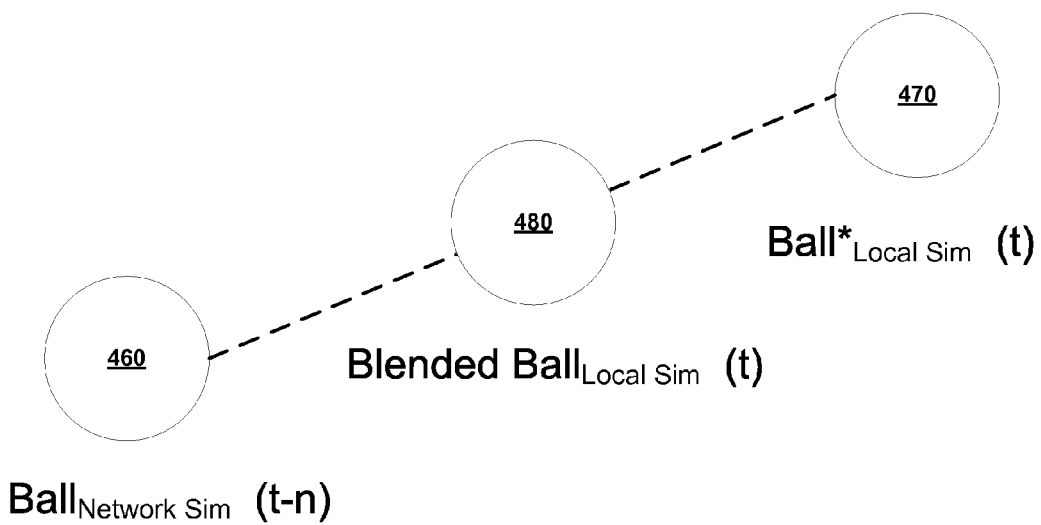
FIG. 4B illustrates a course-corrected shared global object.

FIG. 4B illustrates a course-corrected shared global object. In one embodiment, $Ball_{Network\ Sim}$ (t-n) 460 represents an output from a network simulation and $Ball*_{Local\ Sim}$ (t) 470 represents an output from a local simulation. The amount of error between the two simulations can be course-corrected, such that the local simulation is rendered with a global shared object that is locationally closer to the network simulation. Course-correction may include blending the ball at the network simulation with the ball at the local simulation, to produce a Blended $Ball_{Local\ Sim}$(t) 480. The Blended $Ball_{Local\ Sim}$(t) 480 may then be rendered and displayed to the local player. The blending may be virtually unnoticeable by the player and gives the illusion that the local simulation is updating in real-time. This provides a lag-free online game experience.

Figure 5:
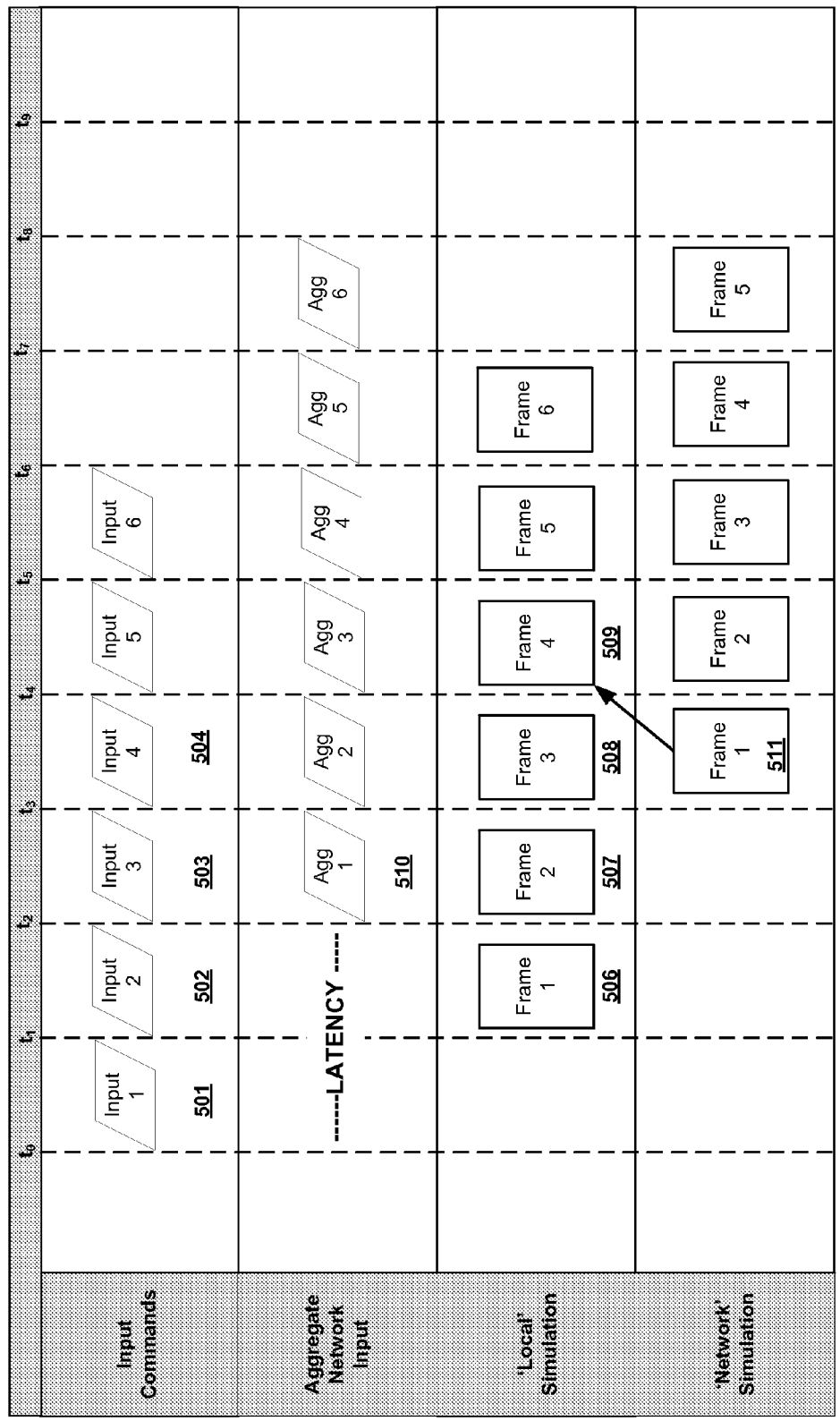
FIG. 5 illustrates a game command flow between components of a network simulator and a local simulator.

FIG. 5 illustrates a game command flow between components of a network simulator and a local simulator. A local and a network simulation are generated for each frame for game play. The local simulation provides a "real-time" gaming experience for the local game player. The local simulation may be generated for a frame using, for example, input packet 1 (501) for Frame 1 506 at time phase $t_1$. Likewise, local simulations may be generated using input packet 2 (502) for Frame 2 507, input packet 3 (503) for Frame 3 508, and input packet 4 (504) for Frame 4 509 where $t_2$, $t_3$, and $t_4$, respectively, represent increasing time phases. Moreover, the local simulation for a current time phase may also be generated using the outputs of the network simulation for a frame in a previous time. For example, the local simulations for Frame 1 (506), Frame 2 (507), and Frame 3 (508) are based on the input commands from input packet 1 (501), input packet 2 (502), and input packet 3 (503), respectively. The local simulations for the first three frames do not include results from the network simulation since network simulations are non-existent from $t_1$ thru $t_3$. In this embodiment, the first network simulation does not appear until $t_4$. Unlike previous Frames 1-3, Frame 4 (509) is generated using the results of the network simulation at Frame 1 (511) and the local player's input command, i.e., input packet 4 (504).

The network simulation in the game play is not rendered but enables course-correction to be performed on shared global objects in the game. The network simulation is generated based on network input, which may include an aggregation of state, interaction data, and input commands for every player within the network of game play for a frame. In one embodiment, network latency between $t_0$ and $t_2$ has caused a delay such that the network input commands are not received by the local node until $t_3$ where aggregate network input for Frame 1 (510) is received. The network simulation for Frame 1 (511) can then be generated at $t_4$ using the aggregate network input for Frame 1 (510).

Figure 6:
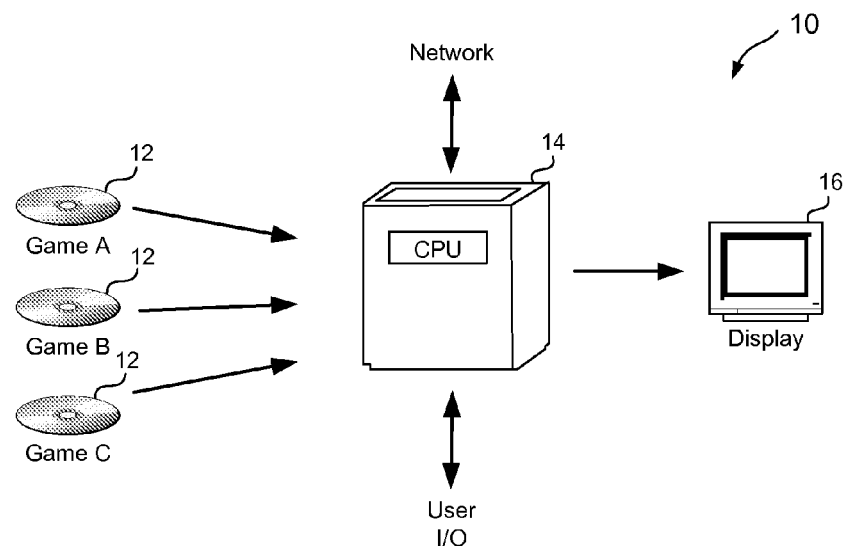
FIG. 6 illustrates a game system for providing one or more games for a user.

FIG. 6 illustrates a game system for providing one or more games for a user. System 10 is shown including one or more game media 12 (game A, game B, game C), a game device 14, and a display 16.

One or more game media 12 can include any game applications that may be used by game device 14 to involve a player in a game (and possibly also non-players who are also around). Each game medium 12 includes logic to provide a game, denoted as game A, game B, and game C. In one embodiment, the game provided by game device 14 is an electronic video game. Games are each individually stored on media, such as compact disk read-only memories (CDROMs), digital versatile disks (DVDs), game cartridges, or other storage media. A game, such as game A, is inserted in, coupled to, or in communication with game device 14 so that game device 14 may read all or part of a game application program code and/or related game data found on game media 12.

Game device 14 is a computing device that includes a processor, such as a CPU, and data storage combined or in separate elements. Game device 14 may be connected to a network that allows game device 14 to provide games that are not included on one or more game media 12. Thus, game A, game B, and game C may be accessed through the network and not be individually stored on game media 12. To allow a user to select from a plurality of available games, a display 16 might present a list of the games provided by game applications on game media 12. A game application may be also referred to as a game code and/or a game program. A game application should be understood to include software code that game device 14 uses to provide a game for a user to play. A game application might comprise software code that informs game device 14 of processor instructions to execute, but might also include data used in the playing of the game, such as data relating to constants, images and other data structures created by the game developer. A user interacts with the game application and game device 14 through user input/output (I/O) devices.

Display 16 is shown as separate hardware from game device 14, but it should be understood that display 16 could be an integral part of game device 14. It should also be understood that game media 12 could be an integral part of game device 14. Game media 12 might also be remote from game device 14, such as where game media is network storage that game device 14 accesses over a network connection to execute code stored on game media 12 or to download code from game media 12.

Figure 7:
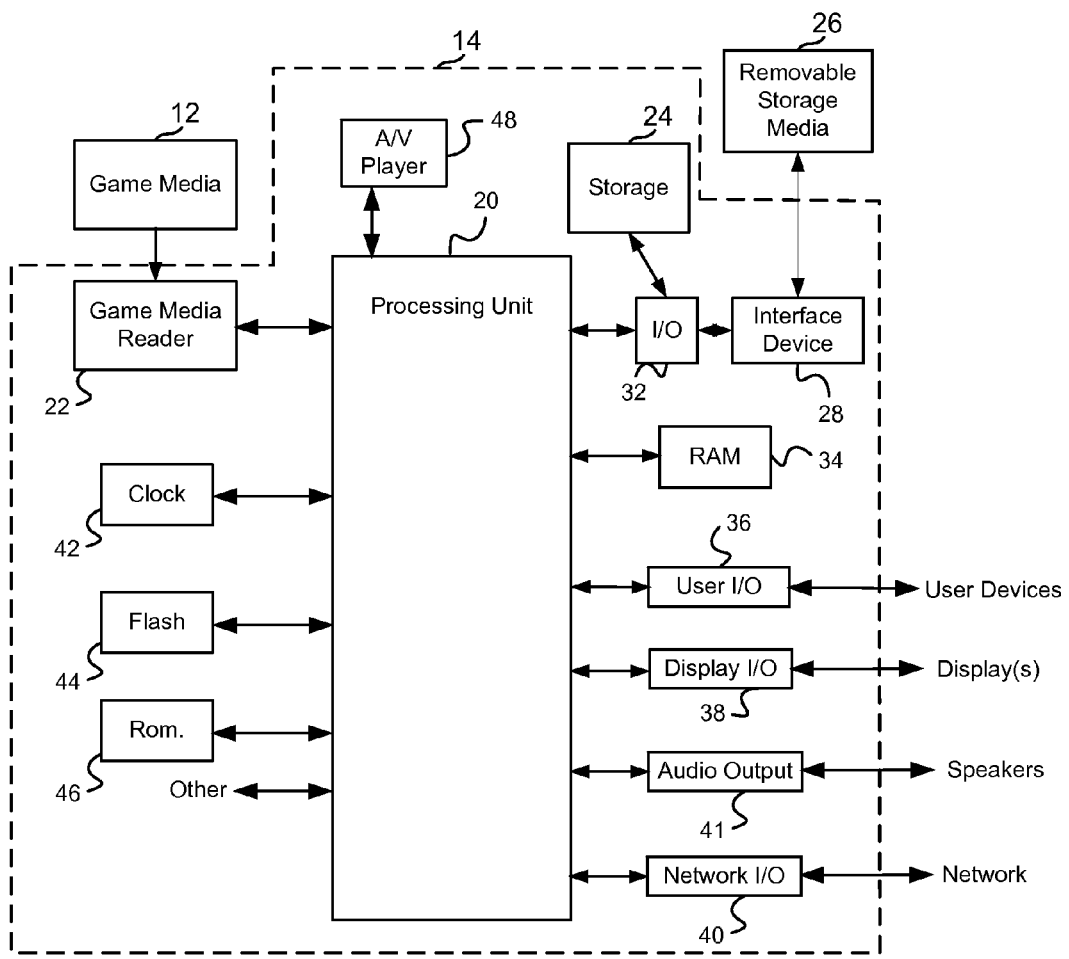
FIG. 7 illustrates a game device that might be used to implement a game system.

FIG. 7 illustrates a game device that might be used to implement a game system. It should be understood that other variations of game device 14 may be substituted for the examples explicitly presented herein and while the hardware might be essential to allow particular player interactivity, it is not essential to an implementation of the invention even if it is essential to the operation of it.

As shown, game device 14 includes a processing unit 20 that interacts with other components of game device 14 and also interacts with external components to game device 14. A game media reader 22 is included that communicates with game media 12. Game media reader 22 may be a CDROM or DVD unit that reads a CDROM, DVD, or any other reader that can receive and read data from game media 12.

Game device 14 also includes various components for enabling input/output, such as an I/O 32, a user I/O 36, a display I/O 38, and a network I/O 40. I/O 32 interacts with a storage 24 and, through an interface device 28, removable storage media 26 in order to provide storage for game device 14. Processing unit 20 communicates through I/O 32 to store data, such as game state data and any data files. In addition to storage 24 and removable storage media 26, game device 14 includes random access memory (RAM) 34. RAM 34 may be used for data that is accessed frequently, such as game code when a game is being played. In one embodiment, the aggregate network input received by the local game system from the network may be persisted in any one or more of storage components, including memory or mass storage components.

User I/O 36 is used to send and receive commands between processing unit 20 and user devices, such as game controllers. Display I/O 38 provides input/output functions that are used to display images from the game being played. Network I/O 40 is used for input/output functions for a network. Network I/O 40 may be used if a game is being played on-line or being accessed on-line. Audio output 41 comprises software and/or hardware to interface to speakers (such as desktop speakers, speakers integrated in game device 14, earphones, etc.). A game device might also have audio inputs (not shown).

Game device 14 also includes other features that may be used with a game, such as a clock 42, flash memory 44, read-only memory (ROM) 46, and other components. An audio/video player 48 might be present to play a video sequence such as a movie. It should be understood that other components may be provided in game device 14 and that a person skilled in the art will appreciate other variations of game device 14.

Figure 8:
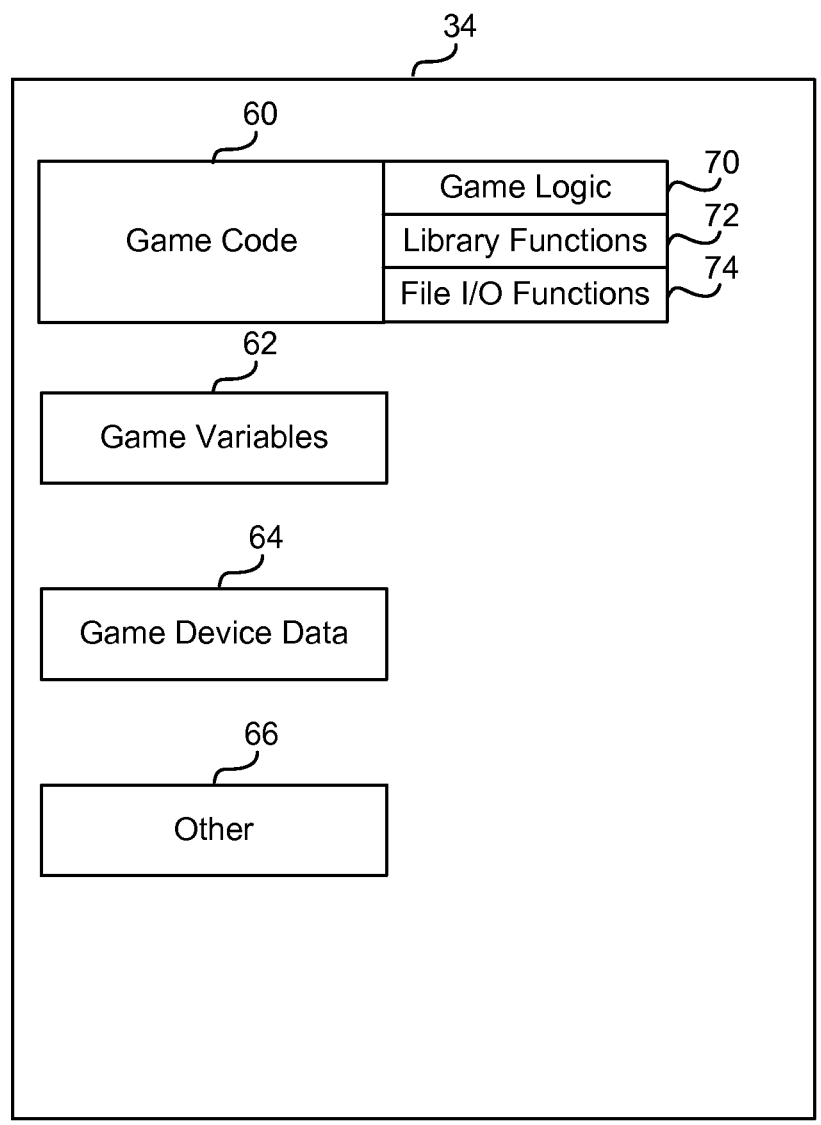
FIG. 8 illustrates an example of game variable memory as might be used in the game device shown in FIG. 7.

FIG. 8 illustrates an example of game variable memory as might be used in the game device shown in FIG. 7. For example, a game code 60, game variables 62, game device data 64, and other data 66 may be downloaded from game media 12 and stored in RAM 34. It will be understood that a person of skill in the art will appreciate other data that may be stored in RAM 34 that will enable game device 14 to provide the game.

Game code 60 may be any logic that is found on game media 12 that is used to provide a game, such as program code comprising a plurality of computer instructions. As shown, game code 60 includes game logic 70, library functions 72, and file I/O functions 74. Game logic 70 is used to provide any functions of the game. Library functions 72 include any functions that are used to support the game. File I/O functions 74 are used by processing unit 20 to perform input/output functions.

Game variables 62 are variables that are specific to a game and are used by processing unit 20 to provide variations of games for different users. The variables allow game device 14 to provide variations to the game based on actions by a user playing the game.

Game device data 64 is data specific to a game hardware that game code 60 is designed for. For example, different versions of game code 60 may be designed for different platforms supported by different game devices 14. Data specifically needed to operate game code 60 on a specific platform for a specific game device 14 may be included in game device data 64. Other data 66 may be any other data that is used with the game.

As a game found on game media 12 is played on game device 14, data regarding the state of the game and any other related aspect of the game may be generated. The game state data is then stored in storage, such as storage 24, removable storage media 26, RAM 34, or any other storage media accessible to game device 14. The game state data may then be used at another time by game device 14 to provide a game that is in the same state as when a user last played the game and saved its state. For example, the game state data may include data that allows a user to continue at a same level that the user has completed, data related to certain achievements that the user has accomplished, etc. It should be noted that the game state data does not necessarily start the game at the same exact place as the place when the game was last stopped but rather may start the game at a certain level or time related to when the game was last stopped or its state was saved.

Game variables might include, for example, view variables, character variables, selection variables, etc. View variables might include, for example, a view point, a view direction (or angle), a view rotation (or orientation), a view extent, cursor location(s), etc. Character variables might include, for example, an array of values for each character active in the game, state data on each character (e.g., name, health level, strength, possessions, alliances, type of character, etc.). Selection variables might include, for example, an array of selected objects.

As used herein, "object" is used to generally refer to logical units of a virtual game space. Examples of objects are trees, characters, clouds, buildings, backgrounds, buttons, tables, lights, etc. Each of these objects might be positioned in a virtual game space, typically a three-dimensional ("3D") space to emulate actual experience. Some objects are player-manipulable characters.

What is claimed is:

1. A method for operating a networked interactive game system comprising at least one local game system and at least one remote game system, wherein a network is interposed between the local and remote game systems, thereby allowing for distributed game play of an interactive game that includes a display of game events with a series of game frames at least at the local game system, the method comprising:
    receiving an input command generated by a local user of the local game system that controls a local object of the interactive game that is displayed in a present game frame;
    predicting a state with a local simulation for the local object in the present game frame based on the input command;
    retrieving state data of a first object of the interactive game that was determined in a network simulation of a previous game frame, wherein the network simulation is run on the local game system and receives states of objects from at least two remote game systems, and at least determines states of objects of the interactive game from the at least two remote game systems for use in game processing;
    course-correcting a global object of the interactive game in the present game frame to be aligned with the global object in the previous game frame using the predicted state for the local object in the present game frame from the local simulation and the state data of the first object of the previous game frame from the network simulation; and
    rendering the present game frame comprising the course-corrected global object.

2. The method of claim 1, wherein the first object is the local object that was determined in the network simulation of the previous game frame and/or a remote object of the interactive game that was determined in the network simulation of the previous game frame and/or the global object that was determined in the network simulation of the previous game frame.

3. The method of claim 1, further comprising:
    interpolating the state for the local object in the present game frame with state data for the local object that was determined in the network simulation of the previous game frame; and
    determining a blended state for the local object in the present game frame.

4. The method of claim 3, further comprising:
    predicting a state for the global object in the present game frame based on a blended state for the local object in the present game frame;
    interpolating the state for the global object in the present game frame with state data for the global object that was determined in the network simulation of the previous game frame; and
    determining a blended state for the global object in the present game frame.

5. The method of claim 4, wherein the present game frame depends on the blended state for the global object and the predicted state for the local object in the present game frame.

6. The method of claim 4, wherein the present game frame depends on the blended state for the global object and the blended state for the local object in the present game frame.

7. The method of claim 1, wherein the present game frame depends on state data of one or more remote objects in the interactive game that were determined in the network simulation of the previous game frame.

8. The method of claim 1, wherein alignment includes scaling the global object of the interactive game in the present game frame with the global object in the previous game frame by a blend weight.

9. The method of claim 8, wherein the blend weight is dynamically adjusted based on a game state.

10. The method of claim 1, further comprising:
    predicting a state of one or more remote objects of the interactive game in the present game frame only if state data for the local object that was determined in the network simulation is deemed unreliable.

11. A system for operating a networked interactive game system comprising at least one local game system and at least one remote game system, wherein a network is interposed between the local and remote game systems, thereby allowing for distributed game play of an interactive game that includes a display of game events with a series of game frames at least at the local game system, the system comprising:
    a local simulator configured to receive an input command generated by a local user of the local game system that controls a local object of the interactive game that is displayed in a present game frame and to predict a state for the local object in the present game frame based on the input command;
    a network simulator run on the local game system configured to determine the state data of a first object of the interactive game of a previous game frame, wherein network simulator at least determines states of objects of the interactive game received from at least two remote game systems for use in game processing;
    course-corrector configured to course correct a global object of the interactive game in the present game frame to be aligned with the global object in the previous game frame using the predicted state for the local object in the present game frame from the local simulator and the state data of the first object of the previous game frame from the network simulator; and
    a renderer configured to render the present game frame comprising the course-corrected global object.

12. The system of claim 11, wherein the first object is the local object that was determined in the network simulation of the previous game frame and/or a remote object of the interactive game that was determined in the network simulation of the previous game frame and/or the global object that was determined in the network simulation of the previous game frame.

13. The system of claim 11, wherein the course-corrector is further configured to:
    interpolate the state for the local object in the present game frame with state data for the local object that was determined in the network simulation of the previous game frame; and
    determine a blended state for the local object in the present game frame.

14. The system of claim 13, wherein the course-corrector is further configured to:
- predict a state for the global object in the present game frame based on a blended state for the local object in the present game frame;
- interpolate the state for the global object in the present game frame with state data for the global object that was determined in the network simulation of the previous game frame; and
- determine a blended state for the global object in the present game frame.

15. The system of claim 1, wherein the course-corrector is further configured to:
- scale the global object of the interactive game in the present game frame with the global object in the previous game frame by a blend weight.

16. A non-transitory computer-readable storage medium comprising instructions that, when executed, cause a system operating a networked interactive game system comprising at least one local game system and at least one remote game system, wherein a network is interposed between the local and remote game systems, thereby allowing for distributed game play of an interactive game that includes a display of game events with a series of game frames at least at the local game system, to:
- receive an input command generated by a local user of the local game system that controls a local object of the interactive game that is displayed in a present game frame;
- predict a state with a local simulation for the local object in the present game frame based on the input command;
- retrieve state data of a first object of the interactive game that was determined in a network simulation of a previous game frame, wherein the network simulation is run on the local game system and receives states of objects from at least two remote game systems, and at least determines states of objects of the interactive game from the at least two remote game systems for use in game processing;
- course-correct a global object of the interactive game in the present game frame to be aligned with the global object in the previous game frame using the predicted state for the local object in the present game frame from the local simulation and the state data of the first object of the previous game frame from the network simulation; and
- render the present game frame comprising the course-corrected global object.

17. The non-transitory computer-readable storage medium of claim 16, wherein the first object is the local object that was determined in the network simulation of the previous game frame and/or a remote object of the interactive game that was determined in the network simulation of the previous game frame and/or the global object that was determined in the network simulation of the previous game frame.

18. The non-transitory computer-readable storage medium of claim 16, comprising instructions that when executed cause the system to:
- interpolate the state for the local object in the present game frame with state data for the local object that was determined in the network simulation of the previous game frame; and
- determine a blended state for the local object in the present game frame.

19. The non-transitory computer-readable storage medium of claim 16, comprising instructions that when executed cause the system to:
- predict a state for the global object in the present game frame based on a blended state for the local object in the present game frame;
- interpolate the state for the global object in the present game frame with state data for the global object that was determined in the network simulation of the previous game frame; and
- determine a blended state for the global object in the present game frame.

20. The non-transitory computer-readable storage medium of claim 16, wherein alignment includes scaling the global object of the interactive game in the present game frame with the global object in the previous game frame by a blend weight.

* * * * *